United States Patent [19]

Petersen

[11] Patent Number: 4,859,833
[45] Date of Patent: Aug. 22, 1989

[54] COOKING APPARATUS

[76] Inventor: Leonard M. Petersen, 45, 30th Ave. Elsies River, Cape Province, South Africa

[21] Appl. No.: 105,500

[22] Filed: Oct. 2, 1987

Related U.S. Application Data

[63] Continuation-in-part of Ser. No. 829,500, Feb. 14, 1986, abandoned.

[51] Int. Cl.⁴ .............................................. H05B 3/68
[52] U.S. Cl. ..................... 219/432; 219/434; 219/436; 219/447
[58] Field of Search ............... 219/429, 432, 433, 434, 219/435, 436, 438, 430, 457, 459, 463, 217, 218, 441, 447, 467

[56] References Cited

U.S. PATENT DOCUMENTS

| | | | |
|---|---|---|---|
| 535,072 | 3/1895 | O'Neill | 219/432 |
| 1,393,751 | 10/1921 | Chapin | 219/432 |
| 1,582,290 | 4/1926 | Marchesseault | 219/435 |
| 1,704,270 | 3/1929 | Wells | 219/432 |
| 1,989,224 | 1/1935 | Beltram | 219/438 |
| 2,145,107 | 1/1939 | Benander | 219/435 |
| 2,450,336 | 9/1948 | Hall | 219/432 |
| 2,543,052 | 2/1951 | Park | 219/432 |
| 3,056,013 | 9/1962 | Hollerith | 219/441 |
| 3,144,547 | 8/1964 | Price | 219/411 |
| 3,221,137 | 11/1965 | Madden | 219/218 |
| 3,440,404 | 4/1969 | Prescott | 219/432 |
| 3,676,643 | 7/1972 | Vocke | 219/447 |
| 3,681,568 | 8/1972 | Schaefer | 219/441 |

FOREIGN PATENT DOCUMENTS

| | | | |
|---|---|---|---|
| 218379 | 7/1957 | Australia | 219/432 |
| 1403820 | 5/1965 | France | 219/432 |
| 262511 | 7/1949 | Switzerland | 219/432 |

Primary Examiner—Teresa J. Walberg
Attorney, Agent, or Firm—Wood, Dalton, Phillips, Mason & Rowe

[57] ABSTRACT

A cooking pot of the waterless type has an electrical heating element in the thick base thereof. The heating element can be permanently embedded in the base. Alternatively the base can have a blind recess therein into which an electrical heating structure is inserted. This structure is removable from the recess. Various stands for supporting the pots and making electrical connections to the heating structures are also disclosed.

1 Claim, 3 Drawing Sheets

COOKING APPARATUS

This application is a continuation-in-part of application Ser. No. 829,500, filed Feb. 14, 1986, now abandoned.

This invention relates generally to cooking apparatus.

BACKGROUND OF THE INVENTION

Waterless cooking pots have become very popular because cooking in moisture rather than large amount of water prevents the vitamins and minerals in vegetables and other foods being lost in the cooking water. Conventionally waterless cooking pots are used in conjunction with the hot plates of stoves in the same way that traditional thin bottomed pots and pans are.

OBJECT OF THE PRESENT INVENTION

The main object of the present invention is to make it possible for waterless cooking pots to be used where a conventional stove with hot pltes is not available.

BRIEF DESCRIPTION OF THE INVENTION

According to one aspect of the present invention there is provided a waterless cooking pot having a base and an electrical heating element in said base for heating the pot base.

In one form of pot said element is permanently embedded in said base. In another form said base has a recess therein into which said heating element is removably inserted.

According to a further aspect of the present invention there is provided cooking apparatus comprising, in combination, a waterless cooking pot and a base structure for supporting the cooking pot, the pot including a base with an electrical heating element embedded in the base and a plug or a socket for enabling electrical connection to be made to said heating element, and the base structure including a socket or plug compatible with the plug or socket of the cooking pot.

Preferably the base structure includes a plurality of plugs or sockets and is thus adapted to support, and supply power to, a plurality of cooking pots.

The base structure can include a tray having a base wall and upstanding side walls with a plurality of ceramic tiles in the tray.

There can be, in the top face of the ceramic tiles, a depressed area or depressed areas for receiving the pot or pots.

According to another aspect of the present invention there is provided cooking apparatus comprising, in combination, a waterless cooking pot and a base structure for supporting the cooking pot, the base structure having a depression in the top surface thereof for receiving the pot, and a passage leading into said depression through the side wall thereof, there being in said passage an electrical heating element which is free to move along the passage between a position in which it is clear of the depression and a position in which it protrudes into said depression, the cooking pot having a base which has a recess in it which recess is adapted to receive said heating element, the arrangement being such that, in use, the pot is placed in the depression with said recess aligned with the passage, and the heating element is then pushed along the passage and into the recess.

According to a still further aspect of the present invention there is provided, in combination, a pot and a base for heating the pot, the base comprising a plate having an electrical heating element embedded therein and an upper surface on which the pot can stand, an electrical socket or plug attached to the plate, and a further electrical plug or socket compatible with the socket or plug attached to the plate and to which an electric lead is connected whereby insertion of the plug into the socket enables power to be supplied to the plate.

The further electrical plug or socket is preferably mounted on a heat resistant base structure on which said base stands. The base structure can be in the form of a tray which has an upstanding rim, the bottom wall of the tray being lined with heat resistant material.

BRIEF DESCRIPTION OF DRAWINGS

For a better understanding of the present invention, and to show how the same may be carried into effect, reference will now be made, by way of example, to the accompanying drawings in which.

DETAILED DESCRIPTION OF DRAWINGS

Figure 1:
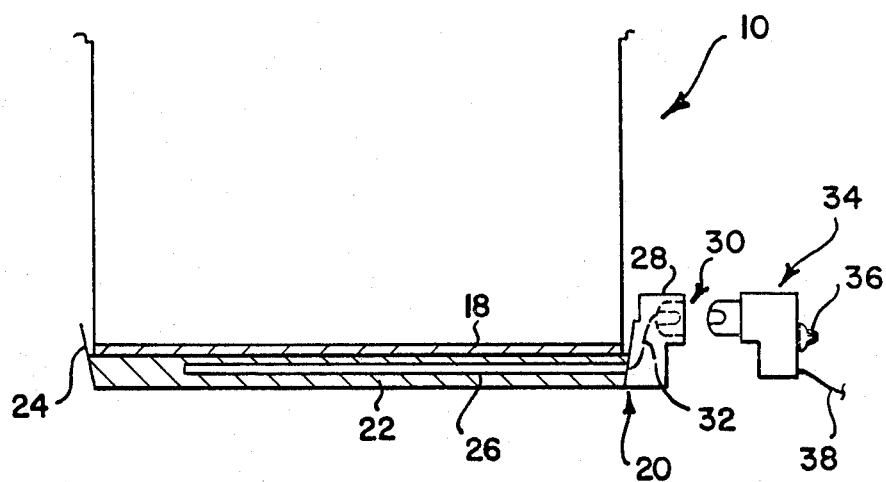
FIG. 1 illustrates the combination of a waterless cooking pot and a base for heating the pot.

In FIG. 1 reference numeral 10 designates a cooking pot of the waterless type which has a thick bottom wall 18. The bottom wall 18 is of an aluminium alloy.

Below the pot 10 is a heating base generally indicated at 20 which is in the form of an aluminium plate 22 having an upstanding rim 24. A heating element 26 is embedded in the plate 22. The pot 10 merely stands on the plate 22 and is a fairly close fit within the rim 24.

The base 20 includes a block 28 attached to the rim 24. The block 28 is formed with an electrical socket 30. Electrical leads 32 connect the socket 30 to the element 26.

A plug 34, into which can be incorporated a timer and/or a thermostat, forms the connection between the socket 30 and the electrical power supply. A knob is diagrammatically shown at 36 and this can serve to control either the thermostat or the timer. If both a thermostat and a timer are provided, then the knob can be in two relatively rotatable, co-axial parts thereby to provide independant controls for the thermostat and the timer.

Figure 2:
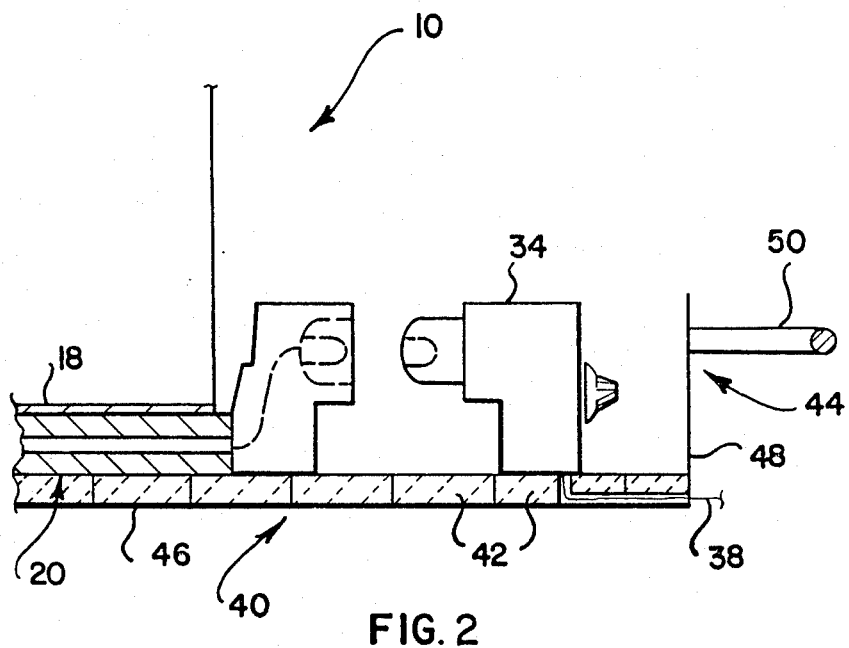
FIG. 2 illustrates the combination of FIG. 1 and a supporting structure.

The plug 34 of FIG. 1 is free in the sense that its only permanent connection is to an electrical lead 38. In contrast, in FIG. 2, the plug 34 is permanently attached to a heat resistant base structure 40 which includes a series of tiles 42. The tiles 42 themselves form a lining for a tray 44 only one end part of which has been shown. The tray comprises a bottom wall 46, side walls 48, and handles at each end. Only one of the handles has been shown and this is designated 50.

The lead 38 extends from the plug 34 through one of the tiles 42, or between two tiles 42, and then between the base wall 46 and the tiles 42 to a point on one of the walls 48 at which a connection is made to the electrical supply.

A number of plugs 34 can be mounted on the series of tiles 42 so that the structure 40 can support, and supply power to, a series of two, three or four pots and pans as desired. Depressed areas can be provided in the series of tiles for receiving the pots and pans. Thus there can be two or more circular depressions for receiving cooking pots of conventional round shape. There can also be a rectangular depression for the pan 10 which is desirably of rectangular shape. Alternatively, there can be circular depressions only.

Figure 4:
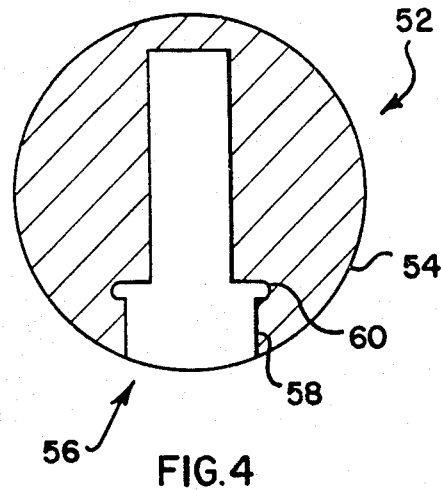
FIG. 4 is a horizontal section through the base of the pot of FIG. 3.
Figure 3:
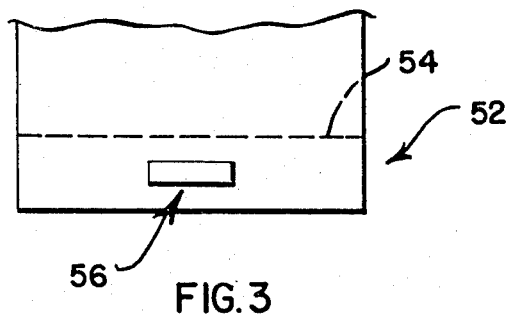
FIG. 3 is a side elevation of part of the base of a waterless cooking pot.

Referring now to FIGS. 3 and 4, the waterless cooking pot 52 shown comprises a thick base 54 which is of aluminium alloy. The base has an elongate, blind recess 56 of rectangular cross section therein, the recess 56 extending diametrically across the base 54. At its open end the recess 56 includes a wider portion 58 which is undercut at 60.

Figure 5:
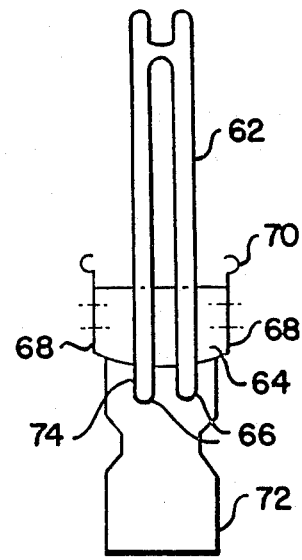
FIG. 5 illustrates a heating structure including a heating element.

The heating structure shown in FIG. 5 includes a heating element 62 mounted on a block 64 of electrically insulating synthetic plastic material. The element 62 is integral with two plug pins 66.

Two or more spring plates 68 are secured, for example by screws, to the outer face of the block 64. The plates 68 are curved over at their free ends to form latch portions 70. The portions 70 are shaped so that they fit in the undercut 60 and retain the heating structure in the recess 56.

The handle 72 has sockets 74 for the pins 66. A releasable locking arrangement (not shown) secures the handle 72 to the block 64. Thus the handle 72 can be used to push the heating structure 62 into, or remove it from, the recess 56. The locking structure can include, for example, a spring loaded detent. When the locking structure is released, the handle 72 can be pulled off the pins 66.

The handle 72 can, if desired, include further sockets or pins (not shown) which are in electrical contact with the socket 74. Thus the handle 72 can form the means through which power is supplied to the element 62.

It is convenient to cast the base 54 around an elongate stainless steel 'box' of suitable shape which is open at one end. The embedded box then bounds the recess 56.

Figure 6:
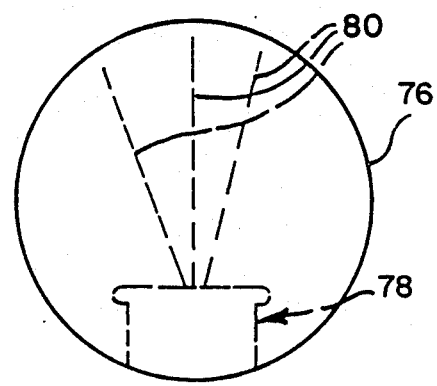
FIG. 6 is an underneath plan view of a further form of waterless cooking pot.

In FIG. 6 there is illustrated a cooking pot base 76 which is cast with a recess 78 in one edge thereof and with three elongate electrical heating elements 80. The elements 80 extend away from the recess 78 which has much the same form as the free end part of the recess of FIG. 4. This enables a handle similar to the handle 72 to be pushed into the recess to make contact with the pins (not shown) of the elements 80.

When the handle 72 serves not solely as a handle but also as the means which connects the heating element (62 in FIGS. 4 and 5 or 80 in FIG. 6) to the electrical supply, the handle may additionally have a thermostat or timer built into it.

Figure 7:
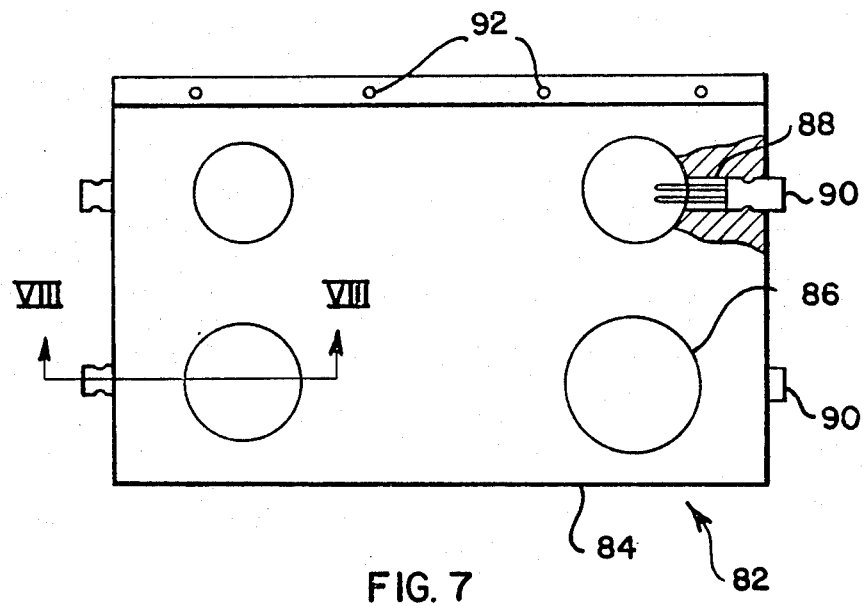
FIG. 7 is a plan view of a pot stand.
Figure 8:
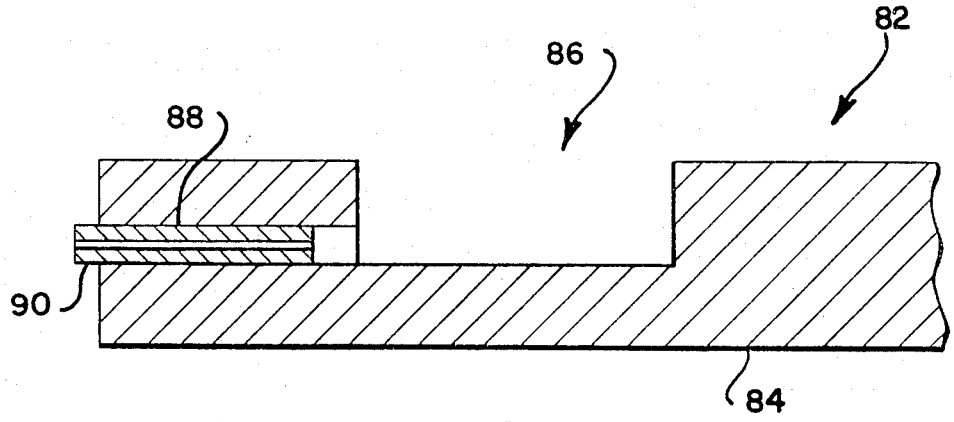
FIG. 8 is a section on the line VIII—VIII of FIG. 7.

The pot stand 82 of FIGS. 7 and 8 comprises a base structure 84 of a heat resistant, non-heat conducting substance such as ceramic. The base structure has four depressions 86 in the top face thereof each of which is intended to receive a pot (not shown). A passage 88 leads into each depression and each passage has an electrical heating structures 90 slidably received therein. One of these structures is shown in FIG. 7 and is also shown diagrammatically in FIG. 8.

The structures 90 can be of the form illustrated in FIG. 5 and the pots can be of the general type described with reference to FIG. 4. The structures 90 protrude beyond the outer periphery of the stand 82.

The electrical connector structures can be connected by cables to rheostats 92 mounted along, for example, the rear edge of the stand 82.

In use of the stand, the pots are placed in the depressions with the recesses 56 aligned with the passages 88. The structures 90 are then pushed along the passage 88 into the recesses 56 by applying forces to their outer ends. The rheostats 92 are then used to supply power to the structures 90 so that the pots are heated.

After cooking, the structures 90 are withdrawn from the recesses 56 into the passages 88 so that the pots can be lifted out of the depressions 86 for washing.

Suitable plugs (not shown) can be provided for sealing-off the recesses 56 before the pots are immersed in washing up water.

While pots which are round in plan view will normally be employed, it will be understood that pots which are rectangular in plan view can also be provided. Such pots are in the nature of baking pans. Where such a pan is provided there can be a divider which spans from one wall of the pan to an opposed wall and separates the space within the pan into two discrete compartments. The compartments can be used simultaneously for different purposes.

The various stands described above can be mounted on a wheeled trolley so that it can be moved about. The trolley can have an upper shelf for the pot stand, and at least one lower shelf or crockery, cutlery etc.

If the depressions 86 (FIGS. 7 and 8) are sufficiently oversized with respect to the pots, then pots including handles 72 as shown in FIG. 5 can be placed in the depressions and moved sideways. This has the effect of causing the handles 72 to enter the passages 88 and make electrical contact with the structures 90. In this form the structures 90 do not themselves have to be movable in the passages 88.

I claim:

1. Cooking apparatus comprising, in combination, a waterless cooking pot and a base structure for supporting the cooking pot, the base structure having a top surface and a depression in the top surface thereof for receiving the pot, the depression having a side wall and there being a passage leading into said depression through the side wall thereof, there being in said passage an electrical heating element which is free to move along the passage between a position in which it is clear of the depression and a position in which it protrudes into said depression, the cooking pot having a base which has a recess in it which recess is adapted to receive said heating element, the arrangement being such that, in use, the pot is placed in the depression with said recess aligned with the passage, and the heating element is then pushed along the passage and into the recess.

* * * * *